United States Patent Office 2,773,083
Patented Dec. 4, 1956

2,773,083

PROCESS OF PRODUCING ORGANIC IRON AND ALUMINIUM ALCOHOLATES

Fritz Schmidt and Otto Bayer, Leverkusen, Germany, assignors to Farbenfabriken Bayer Aktiengesellschaft, Leverkusen, Germany, a corporation of Germany No Drawing. Application August 8, 1951,
Serial No. 240,974

Claims priority, application Germany August 23, 1950

5 Claims. (Cl. 260—439)

The present invention relates to a process of producing organic iron and aluminium compounds of the type of iron and aluminium alcoholates.

Iron ethylate is obtained by reacting anhydrous sodium ethylate upon sublimed ferric chloride dissolved in anhydrous alcohol. Aluminium alcoholates are produced in an analogous manner. However, aluminium alcoholates may also be obtained by dissolving activated aluminium in an alcohol. These metal alcoholates are soluble in organic solvents and decompose with water while forming the corresponding metal hydroxides. They find application as catalysts, for the manufacture of solutions of colloidal metal hydroxide etc.

A process is described in the literature according to which sublimed iron chloride is dissolved in absolute alcohol and the resulting solution is saturated with dry ammonia gas whilst carefully excluding water. A light yellow precipitate is formed.

In accordance with the present invention iron and aluminium compounds of the type of iron and aluminium alcoholates are obtained by reacting upon an iron or aluminium halide dissolved in an alcohol, ammonia or an amine in such a quantity that the initially strongly acid reacting solution reacts neutral or almost neutral i. e. is substantially neutralized, so that a precipitation of an iron or aluminium compound does not take place. The process of the invention gives rise to compounds being soluble in organic solvents and yield the corresponding metal hydroxides with water. These compounds probably belong to the group of the metal alcoholates.

The new process of producing compounds of the type of iron or aluminium alcoholates which are soluble in organic solvents and readily hydrolysable with water, displays considerable advantages over the above described prior art processes. If organic iron compounds are to be produced the reaction with ammonia or an amine is substantially more convenient and less expensive than with alkali metal alcoholates. If organic aluminium compounds are to be obtained the new process shows the additional advantage that instead of the more expensive metallic aluminium the readily available and cheap aluminium chloride may be used.

The new process is accomplished by dissolving an anhydrous iron or aluminium halide in absolute alcohol whereby preferably at least 3 mols of alcohol are employed per one mol of the corresponding metal halide, adding dry gaseous ammonia or ammonia dissolved in an organic solvent until the solution has no longer an acid reaction to wet indicator paper. It is sometimes of advantage to add some benzene, ether or other inert solvents in order to promote the separation of the simultaneously formed insoluble ammonium halide. Instead of ammonia derivatives of ammonia, for instance, aliphatic, hydroaromatic or aromatic amines may likewise find application. However, ammonia will be generally preferred for economic reasons. For the same reason, preference is mostly given to the chlorides of iron and aluminium over the other halides.

The rise of temperature occurring in the reaction of ammonia or its derivatives upon the dissolved metal halides is kept by cooling in moderate limits; for instance, in the reaction of an iron halide the temperature shall not exceed 50° C. After completion of the reaction the simultaneously formed ammonium halide or its derivativees is separated in known manner and liberated from any adherent traces of the solution by washing with alcohol, benzene or ether. The clear solutions being colorless when the reaction is carried out with an aluminium halide and being deep brown when the reaction is carried out with an iron halide, can be further liberated from excess solvent by evaporation, preferably in vacuum at temperatures below 50° C. for avoiding decomposition, which is of special importance in the reaction of an iron halide. The aluminium and iron compounds obtained according to the present invention are sensitive to moisture and must be stored in closed vessels. They may be employed, for instance, as catalysts.

The invention is further illustrated by the following examples without being restricted thereto.

Example 1

133 grams of anhydrous aluminium chloride are dissolved in 200 grams of absolute ethanol charged in a glass flask of a capacity of 2 liters, which is provided with a stirrer, a reflux condenser and a thermometer, and protected against the excess of air humidity by a drying tube equipped at the upper end of the condenser and filled with solid sodium hydroxide. The temperature is kept below 60° C. by cooling. 500 cc. of dry benzene are added and dry ammonia gas is introduced with stirring, the temperature of the reaction solution being kept below 60° C. Ammonium chloride precipitates. When a drop of the reaction mixture has a neutral reaction to wet indicator paper, the addition of ammonia is stopped and after stirring for 10 minutes the precipitated ammonium chloride is sucked off while avoiding the access of moisture and washed with dry benzene. The filtrate is a colorless liquid having the same properties as a solution of aluminium ethylate in benzene.

In the above reaction aluminium chloride may be replaced, for instance, by 266 grams of aluminium bromide and ethyl alcohol, for instance, by 250 grams of propyl alcohol or 300 grams of butyl alcohol.

Example 2

162 grams of sublimed ferric chloride are dissolved while cooling in 300 grams of n-butanol as described in Example 1, mixed with 500 cc. of benzene and ammonia is introduced until the solution reacts neutral. The reaction temperature is kept below about 40–50° C. After filtering off and washing the precipitated ammonium chloride a deep-brown clear solution is obtained which yields a brown iron hydroxyl gel on storing in the air or on contacting with water. Excess solvent can be removed by evaporation in vacuum.

Example 3

Instead of the ammonia used in Example 2, a solution of 297 grams of dry cyclohexylamine in 250 cc. of benzene is dropped in under otherwise equal conditions. After removing the preicipitated cyclohexyl ammonium chloride deep-brown solution with the same properties as those described in Example 2 is obtained.

We claim:
1. A process for the production of metal alcoholates, which comprises dissolving an anhydrous metal halide selected from the group consisting of iron halide and aluminum halide in a lower alkanol, in the molar ratio of at least 3 mols of alcohol per mol of metal halide, substantially neutralizing the resulting acidic alcoholic solution of said halide with an anhydrous nitrogen compound selected from the group consisting of ammonia and cyclohexyl amine, and recovering metal alcoholates.

2. A process in accordance with claim 1, in which said halide is iron halide and said nitrogen compound is ammonia.

3. A process in accordance with claim 2, in which said iron halide is iron chloride.

4. A process in accordance with claim 1, in which said halide is aluminum halide and said nitrogen compound is ammonia.

5. A process in accordance with claim 4, in which said aluminum halide is aluminum chloride.

References Cited in the file of this patent

UNITED STATES PATENTS 2,187,821     Nelles _____ Jan. 23, 1940

FOREIGN PATENTS 334,820     Great Britain _____ Sept. 11, 1930

OTHER REFERENCES

Jennings et al.: J. Chem. Soc. (1936), pages 637—640. (Copy in Scientific Library.)

Thomas: Anhydrous Aluminum Chloride in Organic Chemistry, page 618, Reinhold Pub. Corp., New York City (1941). (Copy in Sci. Library.)

Wardlaw et al.: Nature, vol. 165, pages 75–76, Jan. 14, 1950. (Copy in Scientific Library.)

Cullinane et al.: J. Soc. Chem. Ind., vol. 69, #1 (1950), pages S38–S40.